Oct. 20, 1925.  
B. CASPAIN  
1,557,654  
OIL GAUGE  
Original Filed March 18, 1924
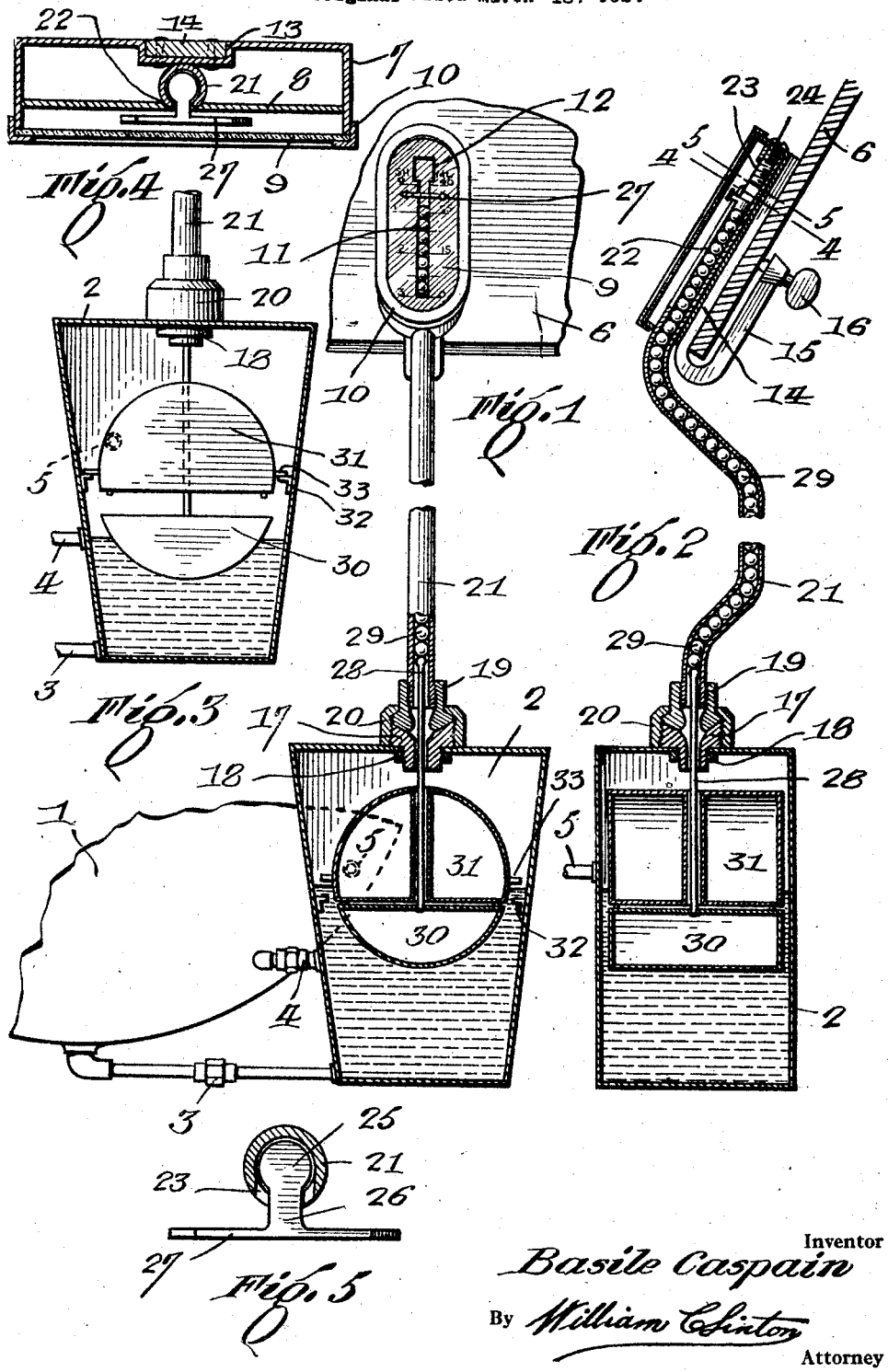
Inventor  
Basile Caspain  
By William Clinton  
Attorney Patented Oct. 20, 1925.

1,557,654

UNITED STATES PATENT OFFICE.

BASILE CASPAIN, OF MONTREAL, QUEBEC, CANADA, ASSIGNOR TO EAGLE UTILITIES COMPANY, OF DETROIT, MICHIGAN, A COPARTNERSHIP CONSISTING OF ELIAS P. ASMUR, ALBERT SAGHBINI, AND BASILE CASPAIN.

OIL GAUGE.

Application filed March 18, 1924, Serial No. 700,132. Renewed September 2, 1925.

*To all whom it may concern:*

Be it known that I, BASILE CASPAIN, a subject of the King of Great Britain, residing at Montreal, Province of Quebec, Canada, have invented certain new and useful Improvements in Oil Gauges; and I do hereby declare that the following is a full, clear, and exact description of the invention, such as will enable others skilled in the art to which it appertains to make and use the same.

The present invention pertains to a novel oil gauge designed particularly to indicate the amount of oil contained within the crank case of an automobile.

The principal object of the invention is the provision of a device of this character including a float the weight of which is automatically decreased for lower liquid levels.

The invention comprises a reservoir having tubular connection with the crank case of an automobile and an indicator casing, there being a tube extending from the reservoir to the casing. The portion of the tube disposed in the casing carries an indicating member, while on the other end of the tube is mounted a stem which also extends into the reservoir. The lower end of the stem has fixed thereto a float upon which is placed a second float loosely surrounding the stem. This second float is adapted to be supported solely by the reservoir after a predetermined level in the reservoir has been passed in the decrease of the supply of oil. The second float thus passes out of operation, whereby a lighter and more sensitive float is provided for the lower liquid levels. Obviously, the indicating device is graduated in accordance with the change in weight of the float and the volume of the reservoir.

The invention is fully disclosed in the following description and in the accompanying drawings in which:

Figure 1 is an elevation of the device partly in section;

Figure 2 is a sectional view thereof at right angles to Figure 1;

Figure 3 is a sectional view through the reservoir, the float being in a relatively low position;

Figure 4 is a section on the line 4—4 of Figure 2; and,

Figure 5 is a section on the line 5—5 of Figure 2.

Reference will now be had to these views by means of like characters which are employed to designate corresponding parts throughout.

In Figure 1, the numeral 1 indicates the crank case of an automobile, there being disposed adjacent the case a reservoir 2. The latter is placed in tubular connection with the crank case by means of three couplings 3, 4 and 5 disposed at different levels.

To the dashboard 6 is secured an indicator frame comprising a housing 7 having a scaled plate 8 provided therein. The front side of the casing is open and is covered by a glass plate 9 held in place by a frame 10. The scaled plate is formed with a longitudinal slot 11 having an enlarged upper end 12, the purpose of which is pointed out below. The back of the casing 7 has a groove 13 in which is received one leg 14 of a curved clamp, the remaining end 15 engaging the back of the dashboard. The two arms are held in engagement with the dashboard by means of a thumb screw 16 threaded through the member 15 and bearing against the back of the board.

An apertured member 17 is passed through the top of the reservoir 2 and secured thereto by means of a collar 18 screwed on the lower end thereof and bearing against the lower face of the reservoir cover. Upon the member 17 is placed an internally threaded nipple 19 which is held against the bolt 17 by means of an internally threaded ring 20 surrounding both members. Into the nipple 19 is threaded the lower end of a tube 21, the upper end thereof extending longitudinally through the casing 7, as shown in Figures 2, 4 and 5. The portion of the tube within the casing has a longitudinal slot 22, the upper end thereof being enlarged as at 23 for a purpose pointed out below. It will be seen from Figure 4 that the tube engages the scaled plate 8, the slots of both these members being in registration. Through the top of the casing 7 is passed a screw 24 entering the upper extremity of the tube and substantially covering the enlarged portion 23.

In the upper end of the tube is disposed an indicator comprising a cylinder 25 and a neck 26 extending therefrom through the slots 11 and 22. The outer end of the neck carries a cross arm 27 disposed at the face of the scaled plate and cooperating therewith. A stem 28 is disposed within the reservoir 2 and has its upper end passed through the members 17 and 19 and received in the lower part of the tube 21. A plurality of balls 29 are contained within the tube establishing an operative connection between the stem and the cylinder 25. A section 30 of a cylinder is secured to the lower end of the stem, the remaining portion 31 of the cylinder being disposed above the section 30 and penetrated by the stem so as to be slidable with relation thereto as clearly shown in Figures 1 and 2. The inner walls of the reservoir carry brackets 32 adapted for engagement by lugs 33 provided on the periphery of the member 31.

The members 30 and 31 are hollow and water-tight and function together as a float when the liquid level is above the brackets 32, as may be clearly seen from Figure 1. In this condition the indicator 27 is disposed at the upper end of the scaled plate. When the liquid level descends, the lugs 33 engage the brackets 32 and the portion 31 is thus supported above the liquid level as shown in Figure 3. The section 31 descends, however, since the stem 28 is adapted to slide through the portion 31. By reason of this construction, a lighter, and hence more sensitive float is provided for lower liquid levels.

When the lower float member 30 comes into operation alone for lower liquid levels and the portion 31 is supported on the bracket 32, the lugs 33 are directly in contact with the inclined sides of the reservoir 2 as shown in Figure 3. Moreover, the straight sides of the portion 31 are very slightly spaced from the straight walls of the reservoir as illustrated in Figure 2. The upper float member 31 is therefore prevented from moving about due to swashing of the liquid. Since the stem 28 supporting the lower part 30 passes through the upper portion 31 and fits rather closely therein, the lower portion is also prevented from moving about.

The scaled plate 8 is obviously graduated with respect to the change in weight of the float and the volume of the tank. The side "S.H." indicates the amount of oil removed from the tank, while the side "M.L." indicates the number of miles which the automobile may travel with the amount of oil contained in the reservoir.

It will be seen from Figure 2 that the screw 24 serves to hold the tube 21 in engagement with the top of the casing and at the same time covers the enlarged slot ends 12 and 23. When it is desired to remove the indicator from the tube, the screw is turned so as to uncover the enlarged portions, whereby the cylinder 25 may be drawn through the latter.

It should be noted that if desired this oil gauge may be used as a speed indicator, as when the automobile is travelling the level of the oil into the crank case is lowered in proportion with the speed. Thus, if desired, the gauge may be graduated to indicate the approximate speed.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. An oil gauge comprising a reservoir and an indicator, a stem slidably mounted in said reservoir, a float section secured to said stem, a second float section surrounding said stem and disposed above the first section, lugs extending from said second section, stop members carried by said reservoir and adapted for engagement by said lugs, and an operative connection between said stem and indicator.

2. An oil gauge comprising a reservoir, a stem slidably mounted in said reservoir, a float section secured to said stem, a second float section surrounding said stem and disposed above the first section, lugs extending from said second section, stop members carried by said reservoir and adapted for engagement by said lugs, a tube having one end secured to the reservoir and receiving said stem, a casing receiving the remaining end of said tube, an indicator mounted in the remaining end, and an operative connection between the stem and the indicator.

3. An oil gauge comprising a reservoir, a stem slidably mounted in said reservoir, a float section secured to said stem, a second float section surrounding said stem and disposed above the first section, lugs extending from said second section, stop members carried by said reservoir and adapted for engagement by said lugs, a tube having one end secured to the reservoir and receiving said stem, a casing receiving the remaining end of said tube, an indicator mounted in the remaining end, and a plurality of balls disposed within said tube between the stem and the indicator.

In witness whereof I have hereunto set my hand.

BASILE CASPAIN.